United States Patent
Kanter et al.

(10) Patent No.: US 10,455,049 B2
(45) Date of Patent: Oct. 22, 2019

(54) PRESENTING CONTENT TO AN ONLINE SYSTEM USER BASED ON CONTENT PRESENTED BY A SCROLLABLE CONTENT UNIT

(71) Applicant: Facebook, Inc., Menlo Park, CA (US)

(72) Inventors: Jeffrey Andrew Kanter, San Francisco, CA (US); Sanchan Sahai Saxena, Milpitas, CA (US); Mohit Rajani, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 477 days.

(21) Appl. No.: 14/798,281

(22) Filed: Jul. 13, 2015

(65) Prior Publication Data

US 2017/0017352 A1 Jan. 19, 2017

(51) Int. Cl.
| | | |
|---|---|---|
| *G06F 3/00* | (2006.01) | |
| *H04L 29/08* | (2006.01) | |
| *G06F 3/0485* | (2013.01) | |
| *G06Q 30/02* | (2012.01) | |
| *G06Q 50/00* | (2012.01) | |
| *G06F 3/0482* | (2013.01) | |

(52) U.S. Cl.
CPC .......... *H04L 67/306* (2013.01); *G06F 3/0482* (2013.01); *G06F 3/0485* (2013.01); *G06Q 30/0281* (2013.01); *G06Q 50/01* (2013.01)

(58) Field of Classification Search
CPC ....................... G06Q 30/0241; H04N 5/44543
USPC ......... 705/14.41; 725/42; 715/739, 784, 830
See application file for complete search history.

(56) References Cited

U.S. PATENT DOCUMENTS

| | | | | |
|---|---|---|---|---|
| 6,084,628 A | * | 7/2000 | Sawyer ............... | H04M 3/4878 379/93.12 |
| 8,396,746 B1 | * | 3/2013 | Wang ................. | G06Q 30/0241 705/14.41 |
| 8,560,405 B1 | | 10/2013 | Buron et al. | |
| 9,552,440 B1 | | 1/2017 | Krecichwost et al. | |
| 2002/0138834 A1 | * | 9/2002 | Gerba ................ | H04N 5/44543 725/42 |
| 2013/0147971 A1 | | 6/2013 | Flynn, III et al. | |

(Continued)

OTHER PUBLICATIONS

MSN, "Richest countries in the world", (Oct. 27, 2014), <URL https://www.msn.com/en-ae/money/today/richest-countries-in-the-world/ss-BBbE2tx#image=1 />, p. 1-9 (Year: 2014).

(Continued)

*Primary Examiner* — Andrey Belousov
(74) *Attorney, Agent, or Firm* — Fenwick & West LLP

(57) ABSTRACT

An online system presents a feed of content including content items and one or more scrollable content units to a user of the online system. A scrollable content unit includes an ordered set of content items and a display area presenting fewer than all of the content items of the ordered set at a time. The user navigates through the ordered set of content items in the display area by interacting with the scrollable content unit. If the user navigates through fewer than all of the content items in the ordered set, the online system modifies the ordered set. If the scrollable content unit is again provided to the user, the scrollable content unit presents content items based the modified ordered set. For example, the modified ordered set prioritizes presentation of content items from the ordered set that were not previously presented to the user.

20 Claims, 7 Drawing Sheets

(56) References Cited

U.S. PATENT DOCUMENTS

| | | |
|---|---|---|
| 2013/0179271 A1 | 7/2013 | Adams et al. |
| 2014/0006944 A1 | 1/2014 | Selig et al. |
| 2014/0180823 A1 | 6/2014 | Terrell, II |
| 2015/0287073 A1 | 10/2015 | Liu et al. |
| 2018/0232121 A1 | 8/2018 | Lewis et al. |

OTHER PUBLICATIONS

Moritz, "How to Hyperlink Slides and Layers", (Dec. 8, 2013), <URL https://www.themepunch.com/faq/how-to-hyperlink-slides-and-layers/>, p. 1-8 (Year: 2013).

United States Office Action, U.S. Appl. No. 14/798,267, dated Nov. 17, 2017, forty-two pages.

United States Office Action, U.S. Appl. No. 14/798,267, dated Jun. 1, 2018, forty-one pages.

United States Office Action, U.S. Appl. No. 14/798,267, dated Sep. 20, 2018, thirty-eight pages.

MSN, "Richest Countries in the World", (Oct. 27, 2014), <URL https://www.msn.com/en-ae/money/today/richest-countries-in-the-world/ss-BBbE2tx#image=1/>, pp. 1-10 (Year: 2014).

Swanner, N., "Google Improves Mobile Product Listings, Makes Cards Horizontally Scrollable", (Oct. 18, 2013), <URL https://androidcommunity.com/google-improves-mobile-product-listings-makes-cards-horizontally-scrollable-20131018/>, pp. 1-2 (Year: 2013).

United States Office Action, U.S. Appl. No. 14/798,267, dated Apr. 16, 2019, 45 pages.

Anderson, D., "Extreme URL Slides," pp. 1-2, Nov. 12, 2014 [Online] Retrieved from the Internet<URL:https://www.metaslider.com/documentation/external-url-slides/>.

United States Office Action, U.S. Appl. No. 14/798,267, dated Jul. 31, 2019, 47 pages.

\* cited by examiner

PRESENTING CONTENT TO AN ONLINE SYSTEM USER BASED ON CONTENT PRESENTED BY A SCROLLABLE CONTENT UNIT

BACKGROUND

This invention relates generally to online systems, and more specifically to presenting content to an online system user.

Online systems, such as social networking systems, allow users to connect to and communicate with other users of the online system. Users create profiles on an online system that are tied to their identities and include information about the users, such as interests and demographic information. The users may be individuals or entities such as corporations or charities. Because of the increasing popularity of online systems, and the significant amount of user-specific information maintained by online systems, an online system allows users to easily communicate information about themselves to other users and share content with other users. For example, an online photo and video sharing system generates content feeds for presenting photos and videos uploaded by its users to other users. In addition to photos and videos, other types of content uploaded and shared by online system users may be presented, such as stories describing actions performed by online system users, status updates, event announcements, activity invitations, location check-ins, or any other suitable information.

Additionally, entities may sponsor presentation of content items via an online system to gain public attention for the entity's products or services, or to persuade online system users to take an action regarding the entity's products or services. Many online systems receive compensation from an entity for presenting online system users with certain types of sponsored content items provided by the entity. Frequently, online systems charge an entity for each presentation of sponsored content to an online system user (e.g., each "impression" of the sponsored content) or for each interaction with sponsored content by an online system user (e.g., each "conversion"). For example, an online system receives compensation from an entity each time a content item provided by the entity is displayed to a user on the online system or each time a user is presented with a content item on the online system and the user interacts with the content item (e.g., requests additional content by interacting with the content item).

Online systems commonly present their users with feeds of content that include sponsored content items and content items selected for presentation to a user by the online system. As users of online systems more frequently access content via mobile devices or other devices with a limited display area, an online system may combine multiple content items into a scrollable content unit to reduce the display area in which content is presented without reducing the amount of content presented. A user may view alternative content items included in a scrollable content unit by interacting with the scrollable content unit. For example, a feed of content presented on a mobile device may include a scrollable content unit that displays a content item to a user and includes multiple alternative content items that are presented if the user interacts with the scrollable content unit (e.g., by swiping a screen of a display device presenting the scrollable content unit with a finger or stylus). This allows an online system to present multiple content items to a user in a minimally obtrusive manner and increases the number of content items capable of presentation to the user.

Although users may view alternative content items included in a scrollable content unit by interacting with the scrollable content unit, online systems may lose opportunities to present content to a user if the user stops interacting with the scrollable content unit before all of the content items included in the scrollable content unit have been presented. For example, if a user navigates away from a scrollable content unit without interacting with the scrollable content unit, the online system loses the opportunity to present alternative content items included in the scrollable content unit that would have been presented if the user interacted with the scrollable content unit. This may decrease potential revenue for an online system, such as revenue received from one or more entities in exchange for presenting sponsored content items to a user of the online system. Revenue to the online system may be further decreased if the online system would also earn revenue from interactions by the user with content items in the scrollable content unit that were not presented. While an online system may attempt to recapture these lost opportunities by repeatedly presenting a scrollable content unit at various times, repetitive delivery of the same content may frustrate users and decrease user interaction with the online system, resulting in further loss of potential revenue.

SUMMARY

To enhance user experience, an online system presents a feed of content including content items and one or more scrollable content units to a user of the online system. Each scrollable content unit includes an ordered set of content items and a display area for displaying fewer than all of the content items of the ordered set at a time. Content items in the set of content items may be sponsored by an entity or selected for presentation to the user by the online system based on attributes of the content items and characteristics of the user. One or more user interactions are associated with the scrollable content unit to allow a user to navigate through the ordered set of content items in the display area. In various embodiments, the scrollable content unit is scrollable in a direction that is orthogonal to an orientation of the feed so additional content items from the ordered set are displayed in the display area as the user interacts with the scrollable content unit. For example, a scrollable content unit presented in a vertically-oriented content feed includes an ordered set of advertisements and is horizontally scrollable so that additional advertisements from the set are presented in the display area as a user interacts with the scrollable content unit (e.g., when a user performs a horizontal gesture with a portion of a display device presenting the scrollable advertisement unit). If fewer than all of the content items in the ordered set of content items are presented in the display area (e.g., the user stops interacting with the scrollable content unit before each content item in the ordered set of content items is displayed), the online system modifies the ordered set of content items and subsequently provides the scrollable content unit including the modified ordered set of content items to the user. When the scrollable content unit is again provided to the user, a content item from the modified ordered set of content items that was not previously presented to the user in the display area of the scrollable content unit is presented in the display area of the scrollable content unit.

The order of the content items in the ordered set specifies the order in which content items in the ordered set are presented by the display area of the scrollable content unit. For example, content items ordered earlier in the ordered set are presented before content items ordered later in the ordered set. If a scrollable content unit is presented to a user via a content feed and fewer than all of the content items in the ordered set are presented in the display area, the online system modifies the ordered set of content items so that content items that were not presented to the user are prioritized for display to the user when the scrollable content unit is again presented to the user. For example, the ordered set is modified so each content item that was not presented in the display area is reordered ahead of content items that were presented in the display area; hence, when the scrollable content unit is again presented to the user, a content item from the ordered set that was not previously presented to the user via the display area of the scrollable content unit is presented to the user. In some embodiments, the online system excludes content items that were previously presented to the user via the display area from the modified ordered set, so that the scrollable content unit presents content items that were not previously presented to the user when the scrollable content unit is again presented to the. In other embodiments, content items that were previously presented to the user remain in the modified ordered set and reordered behind one or more content items that were not previously presented by the display area of the scrollable content unit.

The scrollable content unit includes different positions in which one or more content items from the ordered set are presented to a user. For example, an initially viewable position corresponds to a content item initially presented by the display area of a scrollable content unit when the scrollable content unit is provided to a user. When the user interacts with the scrollable content unit to navigate through the ordered set of content items (e.g., performs one or more gestures in a portion of a display area of a client device presenting the scrollable content unit), a content item corresponding to a subsequently viewable position is cycled into the display area to present an additional content item from the ordered set to the user. If fewer than all of the content items in the ordered set are presented in the display area, a position in the scrollable content unit that is associated with one or more content items that were not presented in the display area is initially presented in the display area of the scrollable content unit when the scrollable content unit is again presented to the user. For example, the online system associates a content item that was not presented in the display area of the scrollable content unit with the initially viewable position of the scrollable content unit for subsequent presentation to the user.

In some embodiments, the online system orders and dynamically modifies the order of content items in the ordered set based on interactions with the content items by online system users. For example, the online system computes an engagement score for each content item in the ordered set based on a historical number of interactions with each content item by various users of the online system (e.g., all users of the online system, users having specific characteristics) and orders the content items in the set based on the engagement scores. Example interactions with a content item include: expressing a preference for the content item, sharing the content item with another online system user, providing a comment associated with the content item, accessing the content item, and viewing the content item for at least a threshold amount of time. To account for a position bias that may influence interactions with content items displayed in different positions in a content feed, interactions by an online system user with a content item may be scaled by a position discount corresponding to a position in a content feed in which the content item was presented by the online system user when determining an engagement score for the content item. In one embodiment, a normalized engagement score is computed by dividing a number of interactions associated with a content item by the number of impressions of the content item. If the user navigates away from the scrollable content unit or stops interacting with the scrollable content unit before all of the content items of the ordered set are presented, the online system determines engagement scores for content items in the ordered set at a time when the user navigated away from the scrollable content unit or stopped interacting with the scrollable content unit and modifies the order of the content items in the set based on the determined engagement scores for the content items in the ordered set.

In other embodiments, the online system orders and modifies the order of content items in the ordered set based on interactions by the user presented with the scrollable content unit with content associated with the content items in the ordered set that is internal to or external to the online system. For example, the online system orders content items in the ordered set for presentation to the user based on measures of relevance of various content items to the user. In some embodiments, the online system presents a user with a scrollable content unit including an ordered set of advertisements and receives data from an advertiser, a third party system, or an application executing on a client device associated with the user identifying interactions by the user with content associated with one or more content items in the ordered set. If the user navigates away from the scrollable content unit before presentation of all of the content items in the ordered set by the scrollable content unit, the online system modifies the order of the content items in the ordered set based on the received data so content items associated with content with which the user performed a threshold amount of interactions or with which the user performed various types of interactions are prioritized for presentation to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
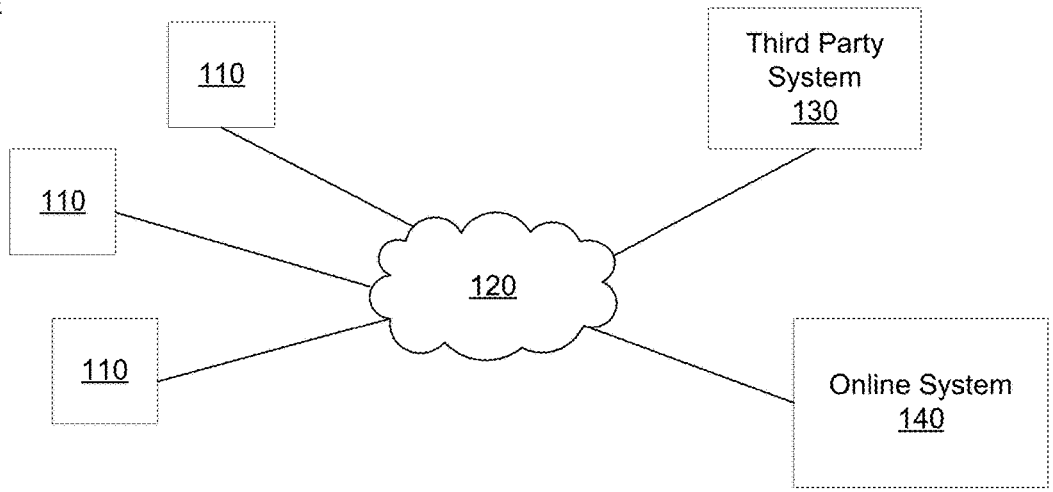
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
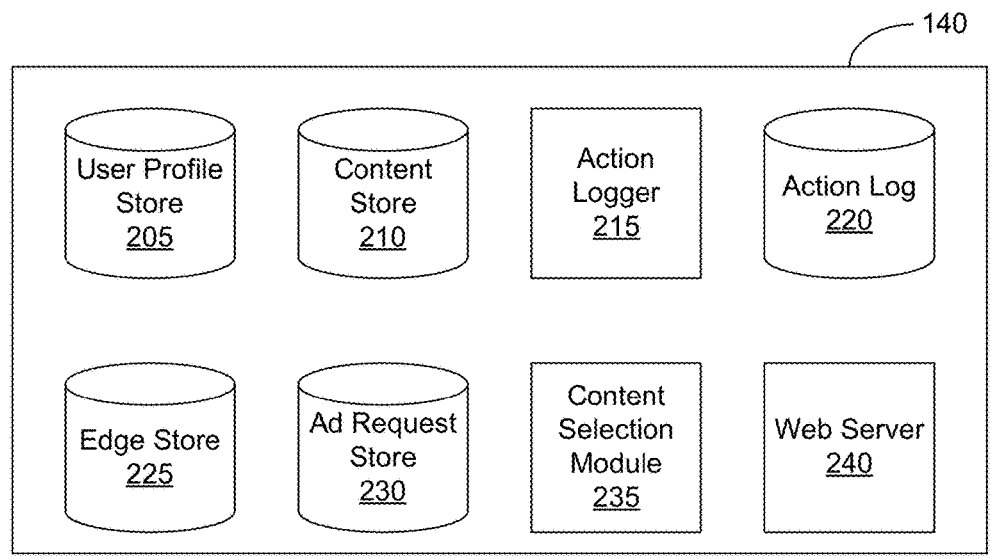
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with user who have interacted with the brand page or with other content associated with the entity, allowing the brand page to include information personalized to a user when presented to the user.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the online system 140.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by an advertiser to the online system 140 if an advertisement in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if an advertisement in an ad request is displayed. In some embodiments, the expected value to the online system 140 of presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on the user's affinity for different content items. Information associated with the user and included in the user profile store 205, in the action log 220, and in the edge store 225 may be used to determine the measures of relevance. Based on the measures of relevance, the content selection module 235 selects content items for presentation to the user.

As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from an ad request or a content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, stories or other data associated with users connected to the identified user are retrieved. Additionally, one or more ad requests may be retrieved from the ad request store 230. The retrieved content items and ad requests are analyzed by the content selection module 235 to identify candidate content that is likely to be relevant to the identified user. For example, content items associated with users not connected to the identified user or content items associated with users for whom the identified user has less than a threshold affinity are discarded as candidate content. Based on various criteria, the content selection module 235 selects one or more of the content items or ad requests identified as candidate content for presentation to the identified user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

When generating a feed of content items for presentation to a user, the content selection module 235 generates one or more scrollable content units for inclusion in the feed along with content items in various embodiments. The scrollable content unit includes a display area and an ordered set of content items. Content items included in the ordered set of content items may include sponsored content (e.g., advertisements) as well as content items selected for the user by the online system 140 without accounting for bid amounts associated with the content items ("organic content items"). In various embodiments, the ordered set of content items includes only organic content items, only ad requests, or both organic content items and ad requests. Content items in the ordered set may be tagged with information, including a topic, a timeframe, a sentiment, a preference, an associated user, or any other relevant information that may be used by the content selection module 235 for identifying and selecting content items for display in a scrollable content unit. In some embodiments, content items in the ordered set of content items each have a common characteristic (e.g., a common topic, a common associated user, etc.). For example, the scrollable content unit displays an ordered set of photographs from the content store 210 that are each tagged with information identifying a particular user of the online system 140.

One or more user interactions are associated with the scrollable content unit to allow a user to navigate through the ordered set of content items by modifying a content item presented in the display area of the scrollable content unit. When a user interacts with the scrollable content unit, a content item presented in the display area of the scrollable content unit changes to another content item in the ordered set of content items included in the scrollable content unit. In some embodiments, the scrollable content unit scrolls in a direction orthogonal to an orientation of the feed of content item when the user interacts with the scrollable content unit. For example, if the scrollable content unit is presented in a vertically-oriented feed of content items, the scrollable content unit horizontally scrolls through the ordered set of content items based on user interactions with the scrollable content unit.

In various embodiments, the order of the content items in the ordered set corresponds to an order in which the content items are presented to a user via the scrollable content unit. For example, content items ordered earlier in the ordered set of content items are presented in the display area of the scrollable content unit before content items ordered later in the ordered set of content items. In some embodiments, a content item in the ordered set is associated with a position for display in the scrollable content unit corresponding to a position of the content item in the ordered set. For example, content items having higher predicted likelihoods of user interaction have higher positions in the ordered set than content items having lower predicted likelihoods of user interaction, so the content items having higher predicted likelihoods of user interaction also have higher positions for display by the scrollable content unit than the content items having lower predicted likelihoods of user interaction (e.g., the content items having higher predicted likelihoods of user interactions are presented by the scrollable content unit before the content items having lower predicted likelihoods of user interaction).

In various embodiments, after a scrollable content unit has been presented to a user by the online system 140 (e.g., presented to a user in a content feed) and the user navigates away from the scrollable content unit, the content selection module 235 modifies the ordered set of content items. For example, the content selection module 235 modifies the ordered set of content items to position content items not presented to the user in the display area of the scrollable content unit when the scrollable content unit was presented to the user in positions of the order that prioritize the content items that were not presented for subsequent presentation to the user (e.g., in an additional scrollable content unit). In some embodiments, the content selection module 235 modifies the order of content items in the ordered set for presentation to the user. Alternatively, the content selection module 235 modifies the ordered set by excluding content items that were previously presented to the user from the modified ordered set. In some embodiments, the content selection module 235 automatically orders content items in the ordered set based on information describing interactions of other online system users with content items in the ordered set as well as the user's interactions with content internal to or external to the online system 140. Scrollable content units are further described below in conjunction with FIGS. 3-8.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
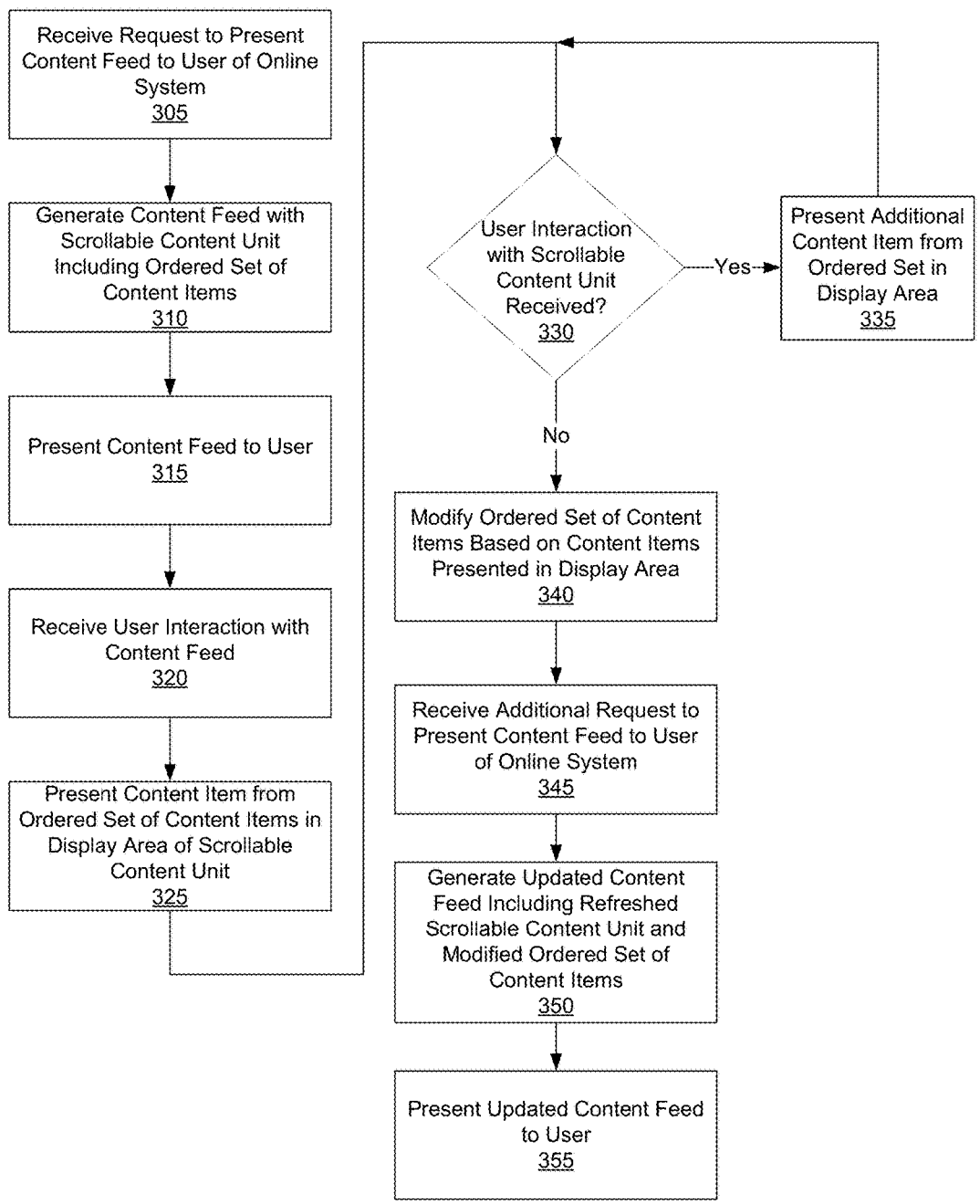
FIG. 3 is a flowchart of a method for presenting content to an online system user based on content presented in a scrollable content unit, in accordance with an embodiment.

Presenting Content to a User of an Online System Via a Scrollable Content Unit Based on Content Previously Presented to the User in a Scrollable Content Unit FIG. 3 is a flowchart of one embodiment of a method for presenting content to a user of an online system 140 via a scrollable content unit based on content items previously by a scrollable content unit. In other embodiments, the method may include different and/or additional steps than those shown in FIG. 3. Additionally, steps of the method may be performed in different orders than the order described in conjunction with FIG. 3 in various embodiments.

The online system 140 receives 305 a request from a user of the online system to present a feed of content (or a "content feed") for display to the user. For example, the online system 140 receives 305 a request from a client device 110 associated with the user to present a feed of image and video content to the user via the client device 110. As another example, the online system 140 receives 305 a request from the client device 110 to present a feed of content provided to the online system 140 by other users of the online system or actions performed by other users of the online system 140. In response to receiving 305 the request, the online system 140 generates 310 a feed of content including a plurality of content items and at least one scrollable content unit, which includes an ordered set of content items and a display area for presenting at least one content item from the ordered set, but fewer than all content items in the ordered set. Content items included in the content feed are selected based on attributes of the content items and characteristics of the user, such as measures of relevance to the user and bid amounts associated with sponsored content items (e.g., ad requests), as further described above in conjunction with FIG. 2. Content items included in the feed of content may be selected from content items and ad requests stored by the online system 140, from content items or ad requests maintained by a third party system 130, from content items or ad requests included in an application, from content items or ad requests stored by the client device 110 from which the request was received, or from any suitable source. In various embodiments, the feed of content includes content items that are sponsored content items (e.g., advertisements from ad requests), content items that are not associated with bid amounts, or content items for which the online system 140 does not receive compensation in exchange for presenting ("organic content items").

When generating 310 the feed of content, the online system 140 determines an order of the ordered set of content items included in the scrollable content unit. In various embodiments, the order of the content items in the ordered set corresponds to an order in which the content items are presented to the user via the scrollable content unit (e.g., content items ordered earlier in the ordered set are presented earlier than content items ordered later in the ordered set). In some embodiments, the content items are ranked based on predicted likelihoods of user interaction with the content items and ordered in the set based on the ranking so content items having higher predicted likelihoods of user interaction are ordered earlier in the ordered set and presented earlier by the scrollable content unit than content items having lower predicted likelihoods of user interaction. For example, the online system 140 orders content items in the set based on information determined by the online system 140 identifying content items relevant to the user so that content items of greater relevance to the user are ordered earlier in the ordered set. The online system 140 may dynamically determine relevance of various content items to the user based on information received by the online system 140 in some embodiments.

In some embodiments, the online system 140 orders content items in the ordered set based on information received from an advertiser, a third party system 130, or an application executing on a client device 110 identifying interactions by the user with content external to the online system 140 associated with one or more content items in the ordered set (e.g., an online store associated with an advertisement in the ordered set that the user accessed). In other embodiments, the online system 140 orders the content items in the ordered set based on interactions by other online system users with the content items in the ordered set or interactions by other online system with content associated with content items in the ordered set. For example, the online system 140 computes an engagement score for each content item in the ordered set based on a historical number of interactions with each content item by various users of the online system 140 (e.g., all users of the online system 140, users of the online system 140 having one or more specific characteristics) and orders the content items in the ordered set based on the engagement scores. In some embodiments, the order of content items in the ordered set is dynamically updated in response to information received from an advertiser, a third party system 130, an application executing on a client device 110, or to a change in engagement scores for the content items. Alternatively, the online system 140 updates the order or content items in the ordered set at periodic intervals by determining engagement scores for the content items at periodic times. In other embodiments, the online system 140 determines engagement scores for the content items in the ordered set in response to certain criteria (e.g., a threshold number of a specific type of interaction by users with a content item in the ordered set) and updates the order of the content items in the ordered set based on the determined engagement scores.

As described above, each position in the order of the ordered set corresponds to a position in an order of presentation of the content items in the ordered set by the scrollable content unit. For example, when the scrollable content unit is presented to a user, a content item having an initial position in the ordered set corresponds to an initially viewable position of the scrollable content unit, so the content item having the initial position in the ordered set is presented in the display area of the scrollable content unit. If the user interacts with the scrollable content unit, a subsequently viewable position associated with a content item having another position in the order of the ordered set is cycled into the display area to present the alternative content item to the user.

The display area of the scrollable content unit presents at least one content item from the ordered set of content items. In some embodiments, the display area presents a single content item from the ordered set, while in other embodiments, the display area presents multiple content items from the ordered set but fewer than the total number of content items in the ordered set. One or more interactions are associated with the scrollable content unit to allow a user to modify the content item from the ordered set presented in the display area, allowing the user to navigate through the ordered set of content items in the display area. In various embodiments, when modifying the content item from the ordered set presented in the display area, the scrollable content unit scrolls in a direction that is orthogonal to an orientation of the feed of content in which the scrollable content unit is presented. For example, a scrollable content unit provided in a vertically-oriented feed of content is horizontally scrollable. In some embodiments, the scrollable content unit may include other elements (e.g., navigational and informational components). Examples of elements included in a scrollable content unit include: a text bar, an icon, a window, a frame, a section, a scroll bar, a tab, an image, a video, an audio file, a menu, a button, a checkbox, a message, a post, a hyperlink, an input field, and one or more interactive elements.

After generating 310 the feed of content, the online system 140 presents 315 the content feed to the user. For example, the online system 140 communicates the content feed to a client device 110 for presentation to the user. The content feed includes the selected content items and the scrollable content unit with a content item from the ordered set of content items presented in the display area of the scrollable content item and remaining content items from the ordered set of content items queued for presentation in the display area when the user interacts with the scrollable content unit. For example, the online system 140 presents 315 a content feed including content items that are photographs associated with a user's profile and a scrollable content unit including an ordered set of photographs having a common characteristic that becomes visible when the user navigates through the content feed. When the scrollable content unit is presented to the user, the scrollable content unit presents a photograph from the ordered set of photographs in the display area of the scrollable content unit. Hence, when the scrollable content unit is presented in the content feed, a content item from the ordered set is presented in the display area of the scrollable content unit.

While the content feed is presented 315 to the user, the online system 140 receives 320 a user interaction with the content feed. In some embodiments, the online system 140 receives 320 a user interaction to modify the content items presented in the feed; however, any suitable interaction with the content feed may be received 320 by the online system 140. For example, a client device 110 presenting the content feed receives a user input in a display area of a client device 110 presenting the content feed to view additional content items within the content feed in the display area of the client device 110 and communicates a description of a user interaction corresponding to the user input to the online system 140. Example user inputs corresponding to user interactions with the content feed include: cursor movements, mouse clicks, and tactile gestures (e.g., a swiping gesture) in a user interface presented in a portion of a display area of the client device 110.

In response to receiving 320 the interaction with the content feed, the online system 140 presents 325 at least one content item from the ordered set of content items in the display area of the scrollable content unit. In various embodiments, the online system 140 presents 325 a content item having an initial position in the ordered set of content items in the display area of the scrollable content unit. For example, the online system 140 orders the ordered set of content item based on expected likelihoods of user interaction with the content items in the ordered set, so the content item having the initial position in the order has a maximum likelihood of being interacted with by the user. The expected likelihoods of user interaction with content items in the ordered set may be determined based on prior interactions by the user with content associated with the content items in the ordered set or based on prior interactions by other online system users with content associated with the content items in the ordered set.

While a content item is presented in the display area of the scrollable content unit, the online system 140 determines 330 whether a user interaction with the scrollable content unit has been received. For example, the online system 140 determines 330 whether information from the client device 110 presenting the scrollable content unit describes a user input received by the client device 110 corresponds to an interaction to present an alternative content item from the ordered set of content items in the display area of the scrollable content unit. Example user interactions with the scrollable content unit may correspond to various user inputs received by the client device 110, such as: movements of a cursor, clicking on a portion of a display device presenting the display area, tactile gestures in the portion of the display device presenting the display area (e.g., swiping, tapping, pressing, or touching and holding), rotating the display device of the client device 110, and any other suitable user input. Additionally, the online system 140 may receive information identifying various actions associated with a content item presented in the display area of the scrollable content unit. Example actions associated with the content item presented in the display area of the scrollable content unit include: expressing a preference of the user for the content item presented in the display area, sharing the content item presented in the display area with another user, requesting additional information associated with the content item presented in the display area, requesting information associated with a user associated with the content item presented by the display area, requesting information associated with an application associated with the content item presented by the display area, requesting information associated with a third party system 130 associated with the content item presented in the display area, or other suitable actions. A third party system 130 associated with a content item in the ordered set may provide the online system 140 with compensation if the content item is presented by the display area of the scrollable content unit or if the user performs one or more specific interactions with the content item when it is presented in the display area.

If the online system 140 determines 330 a user interaction with the scrollable content unit to present another content item from the ordered set of content items has been received, the online system 140 presents 335 an additional content item from the ordered set of content items in the display area of the scrollable content unit. In some embodiments, the client device 110 communicates information describing a user interaction with the scrollable content unit to the online system 140, which retrieves a content item from the ordered set and presents 335 the retrieved content item in the display area of the scrollable content unit. In alternative embodiments, an application associated with the online system 140 executing on the client device 110 identifies an additional content item in the ordered set in response to the interaction to present another content item from the ordered set and presents 335 the additional content item in the display area of the scrollable content unit. In some embodiments, the online system 140 modifies the display area of the scrollable content unit to presenting a content item from the ordered set that has not previously been presented in the display area and that has a position in the order of the ordered set adjacent to a position in the ordered set of the content item currently presented by the display area of the scrollable content unit. Alternatively, the online system 140 modifies the display area of the scrollable content unit to present a content item from the ordered set that has not previously been presented to the user.

However, if the online system 140 determines 330 a user interaction with the scrollable content unit to present another content item from the ordered set of content items has not been received, the online system 140 modifies 340 the ordered set of content items based at least in part on one or more content items presented in the display area of the scrollable content unit. In various embodiments, online system 140 modifies 340 the order of content items in the ordered set is modified to prioritize content items that were not presented to the user in the display area for presentation if the scrollable content unit is subsequently presented to the user. For example, the online system 140 reorders the ordered set of content items so content items that were not previously presented by the display area of the scrollable content unit have higher positions in the order than content items in the ordered set that were previously presented by the display area of the scrollable content unit; hence, modifying 340 the ordered set of content items creates a modified ordered set where a content item from the ordered set that was not previously presented to the user by the display area is initially presented in the display area when the scrollable content unit is again presented to the user. When modifying 340 the ordered set, the online system 140 may maintain an order of content items in the ordered set that were not previously presented to the user relative to each other, while positioning the content items that were not previously presented in higher positions in the order than content items from the ordered set that were previously presented to the user. In some embodiments, the online system 140 excludes content items in the ordered set that were previously presented in the display area from the modified ordered set so that the scrollable content unit does not present content items from the ordered set that were previously presented to the user when the scrollable content unit is again presented to the user. Alternatively, the online system 140 includes previously presented content items in the modified ordered set, allowing the scrollable content unit to again present the previously presented content items.

In various embodiments, the online system 140 modifies 340 the order of content items in the ordered set so content items in the ordered set that have a higher likelihood of user interaction have positions in the order that prioritizes them for presentation when the scrollable content unit is again presented. For example, the online system 140 modifies 340 the order of content items in the ordered set based on interactions by other online system users with the content items in the ordered set or with content associated with the content items in the ordered set. In one embodiment, the online system 140 computes an engagement score for each content item in the ordered set based on a historical number of interactions with each content item by various users of the online system 140 (e.g., all users of the online system 140, users of the online system 140 having one or more specific characteristics) and modifies 340 the order of the content items in the ordered set based on the engagement scores. Example interactions with a content item include: expressing a preference for the content item, sharing the content item with another online system user, providing a comment associated with the content item, selecting the content item, accessing the content item, requesting additional information associated with the content item, viewing the content item for at least a threshold amount of time, or other suitable interactions. An amount of time an online system user views or accesses a content item may also be used by the online system 140 to determine an engagement score for the content item. When determining engagement scores, the online system 140 may differently weight various interactions by online system users with content items. Additionally, the online system 140 may account for a position bias that may influence interactions with content displayed in different positions in a content feed, interactions by an online system user with a content item may be scaled by a position discount corresponding to a position in a content feed in which the content item was presented by the online system user when determining an engagement score for the content item.

Alternatively, the online system 140 modifies 340 the order of the content items in the ordered set based on interactions by the user with content associated with various content items in the ordered set. For example, the online system 140 determines measures of relevance of various content items in the ordered set to the user based on the user's interactions with content (e.g., pages, posts, comments) associated with various content items and modifies 340 the order of content items to content items having greater measures of relevance to the user have higher positions in the order. Measures of relevance of content items to the user may be determined based on information captured by the online system 140, information describing user actions received from a third party system 130 or received from an application executing on a client device 110. Information received from a third party system 130 or from an application executing on a client device 110 may identify content with which the user interacted, as well as a type of interaction by the user with the content. Based on the user's interactions with content internal to or external to the online system 140 that is associated with the content items in the ordered set, the online system 140 modifies 340 the order of the content items in the ordered set. For example, the online system 140 presents a user with a scrollable content unit including an ordered set of advertisements and receives information from an application executing on a client device 110 associated with the user describing content viewed by the user on a web browser also executing on the client device 110. If the user does not interact with the scrollable content unit and the online system 140 and the information received from the application executing on the client device 110 identifies an online store associated with an advertisement in the ordered set that was visited by the user, the online system 140 modifies 340 the ordered set of content items by reordering the advertisement to a higher position in the order than one or more other content items in the ordered set.

In other embodiments, the online system 140 modifies 340 the ordered set of content items by associating content items in the ordered set that were not presented to the user with various positions in the scrollable content unit. For example, a content item in the ordered set associated with a position in the scrollable content unit that was not presented in the display area of the scrollable content unit is associated with an initially viewable position in the scrollable content unit for presentation when the scrollable content unit is again presented. Additional content items in the ordered set that were not presented to the user may also be associated with subsequently viewable positions so that they are presented sequentially in the scrollable content unit after presentation of the content item associated with the initially viewable position (e.g., in response to a user input to navigate through the positions of the scrollable content unit).

The online system 140 may modify 340 the ordered set of content items when the online system 140 receives 345 an additional request to present a content feed to the user. For example, when the online system 140 receives 345 a request from a user of the online system 140 to present an additional content feed or to present additional content in a content feed presented to the user, the online system 140 determines 330 whether all content items in the ordered set have been presented in the display area of the scrollable content unit and modifies 340 the ordered set of content items as described above if fewer than all content items from the ordered set were presented in the display area.

If the online system 140 receives 345 an additional request from the user of the online system to present a content feed to the user, the online system 140 generates 350 an updated content feed including content items selected for presentation to the user and a refreshed scrollable content unit including the modified ordered set of content items. For example, the online system 140 receives 345 an additional request from a client device 110 associated with the user to present an updated content feed to the user or to view additional content items in a content feed presented to the user. The updated content feed may include more than one scrollable content unit, including a refreshed scrollable content unit that includes a modified ordered set of content items from when the scrollable content unit was initially presented to the user. In some embodiments, the updated content feed may include content items previously presented to the user as well as additional content items presented as the user navigates through the content feed. As described above in conjunction with FIG. 2, content items included in the updated content feed are selected based on measures of relevance to the user and bid amounts associated with sponsored content, so the updated content feed may include some, all or no content items previously presented to the user.

After generating 350 the updated content feed, the online system 140 presents 355 the updated content feed including the refreshed scrollable content unit having the modified ordered set of content items to the user. For example, the online system 140 presents 355 an additional content feed to the user with the refreshed scrollable content unit including the modified ordered set of content items, which causes the refreshed scrollable content unit to present a content item from the modified ordered set of content items that was not previously presented to the user in the display area of the refreshed scrollable content unit. The updated content feed may alternatively include the refreshed scrollable content unit but not present a content item from the modified ordered set of content items in the display area of the refreshed scrollable content unit until the user interacts with the updated content feed.

In various other embodiments, when the online system 140 receives 305 a request from a user to present a content feed to the user, the online system 140 retrieves information stored by the online system 140 describing an ordered set of content items associated with a scrollable content unit previously presented to the user in a content feed. Based on the retrieved information, the online system 140 determines whether one or more content items of the ordered set were previously presented in a display area of the scrollable content unit. For example, each content item in the ordered set is associated with a descriptor indicating whether the content item has been presented to the user. The descriptor is updated when the content item is presented, so the online system 140 determines whether a descriptor associated with a content item in the ordered set indicates the content item has been presented. If the online system 140 determines that one or more content items of an ordered set of content items were presented in the display area of the scrollable content unit, the online system 140 modifies 340 the ordered set of content items as described above, generates 350 a refreshed scrollable content unit including the modified ordered set of content items and a display area for presenting at least one but fewer than all of the modified ordered set of content items at a time, and presents 355 the refreshed scrollable content to the user in a feed of content.

EXAMPLES

Figure 4:
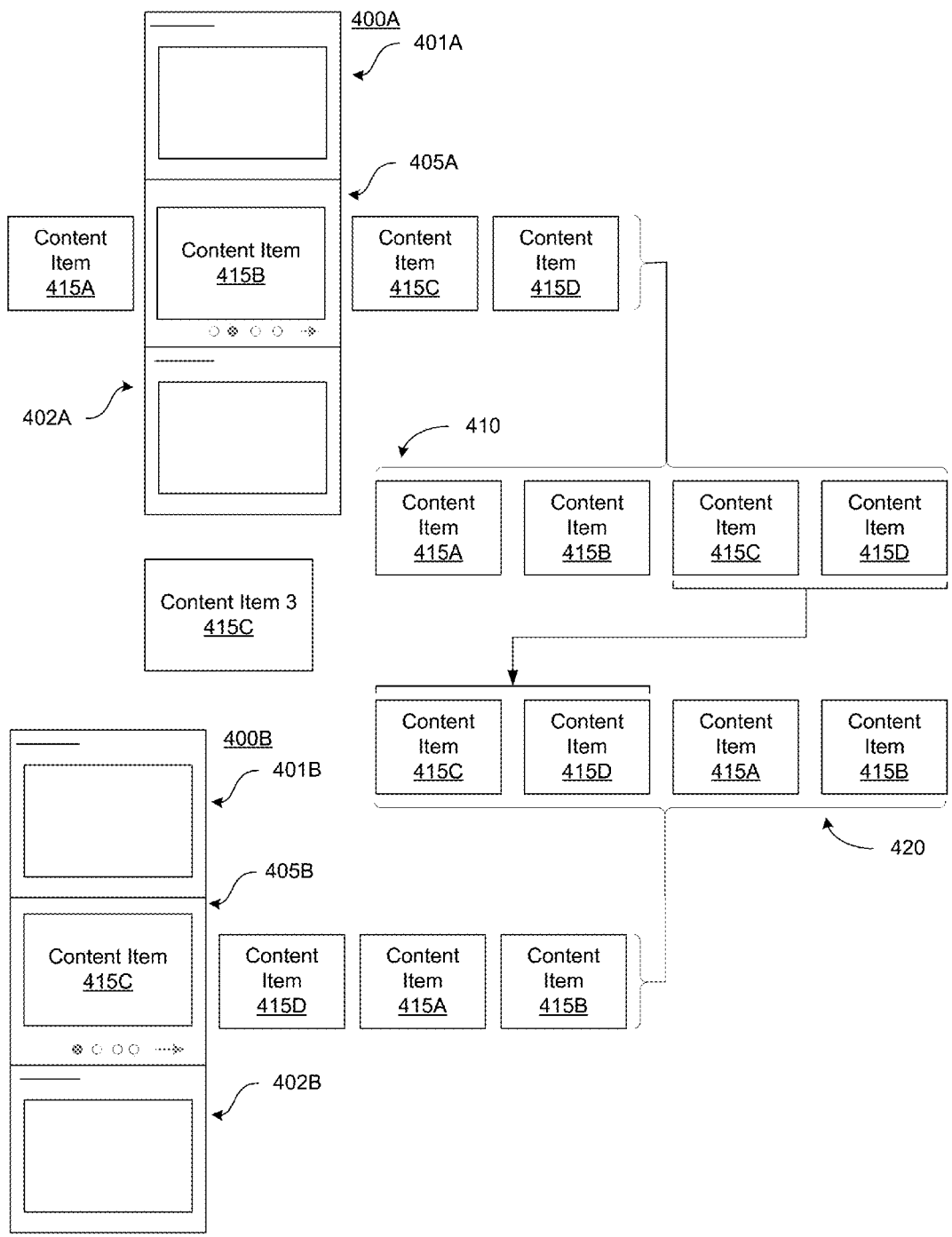
FIG. 4 is an example of presenting content to an online system user based on an order of content presented in a scrollable content unit, in accordance with an embodiment.

FIGS. 4-7 illustrate example presentations of content to an online system user via a scrollable content unit based on content items previously presented in the display area of a scrollable content unit. In the example of FIG. 4, the online system 140 presents a user with a content feed 400A including a plurality of content items 401A, 402A selected by the online system 140 for display to the user. The content feed 400A also includes a scrollable content unit 405A having an ordered set 410 of content items 415A-415D arranged in an order corresponding to the order in which the content items are presented to the user via the scrollable content unit 405A. When the user navigates through the content feed 400A to view the plurality of content items 401A, 402A, as well as the scrollable content unit 405A, in the content feed 400A, a content item 415A having a first position in the ordered set 410 is presented in the display area of the scrollable content unit 405A. Alternatively, the content item 415A having the first position in the ordered set 410 is presented in the display area of the scrollable content unit 405A when the content feed 400A initially presented to the user (e.g., before the user interacts with the content feed 400A). When the online system 140 receives a user interaction with the scrollable content unit 405A to navigate through the ordered set 410 of content items 415A-415D, the online system 140 modifies the display area of the scrollable content unit 405A to present content item 415B, which has a position subsequent to the position of content item 415A in the ordered set 410. In the example of FIG. 4, no further interaction with the scrollable content unit 405A is received by the online system 140.

Because fewer than all content items of the ordered set 410 of content items 415A-415D have been presented in the display area of the scrollable content unit 405A in the example of FIG. 4, the online system 140 modifies the ordered set 410 of content items to generate a modified ordered set 420 of content items 415A-415D. The modified ordered set 420 of content items 415A-415D has an order where content items 415C, 415D, which were not previously presented in the display area of the scrollable content unit 405A, have higher positions in than content items 415A, 415B, which were previously presented to the user. In the example of FIG. 4, content items 415C, 415D retain the same order relative to each other in the modified ordered set 420, but in other embodiments, content items that were not previously presented by the display area of the scrollable content unit 405A may be reordered relative to each other.

When the online system 140 receives an additional request from the user to present a content feed to the user via a client device 110, the online system 140 presents the user with an updated content feed 400B including a plurality of content items 401B, 402B, and a refreshed scrollable content unit 405B that includes the modified ordered set 420. When the user navigates through the updated content feed 400B, content item 415C, which has the first position in the modified ordered set 420 is presented in the display area of the refreshed scrollable content unit 405B. If the user interacts with the refreshed scrollable content unit 405B, the online system 140 presents content item 415D, which has a position subsequent to the position of content item 415C in the modified ordered set 420, in the display area of the refreshed scrollable content unit 405B. Hence, the refreshed scrollable content unit 405B presents content items 415C, 415D that were not previously presented to the user before presenting content items 415A, 415B that were previously presented to the user.

Figure 5:
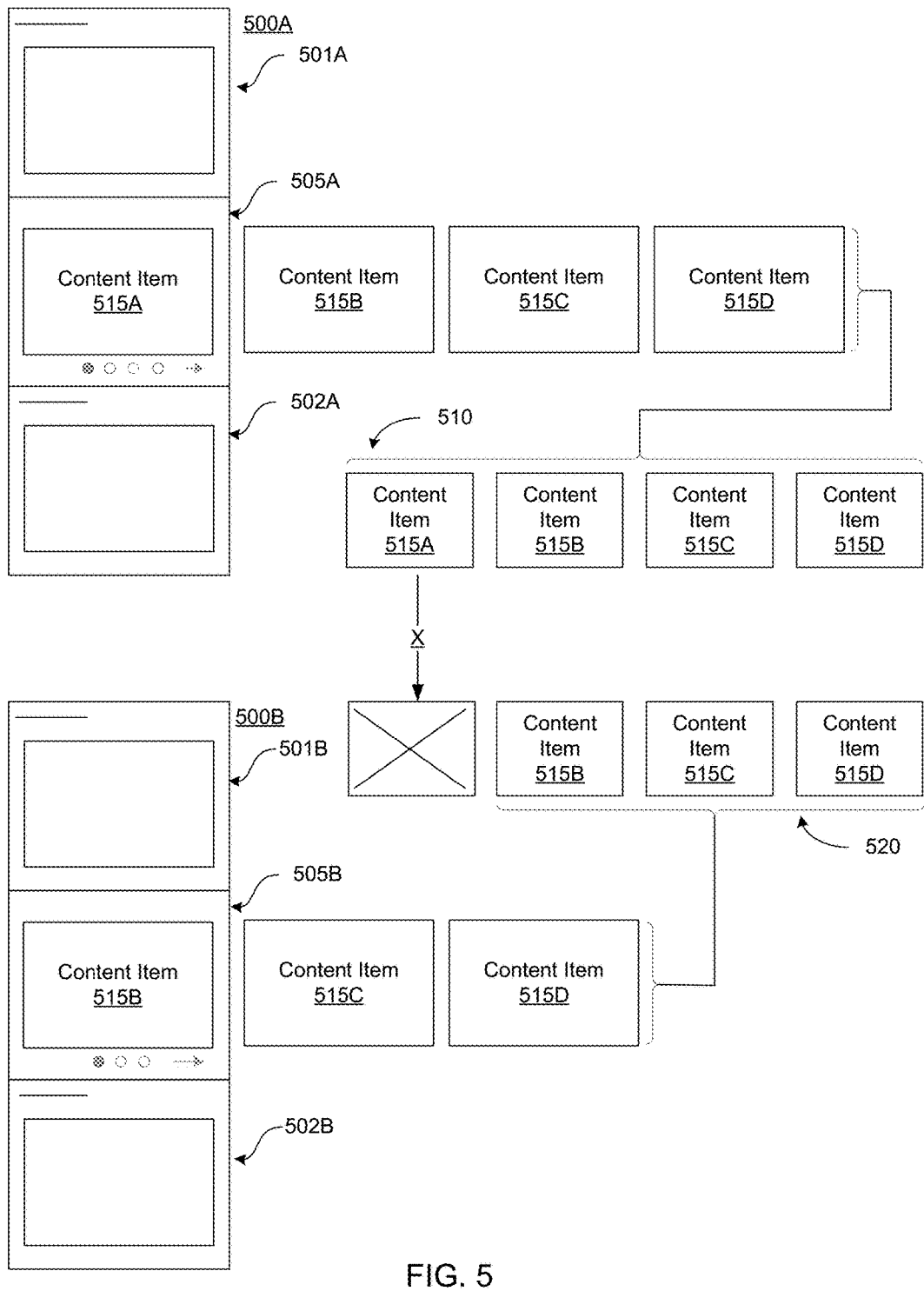
FIG. 5 is an example of presenting content to an online system user based on excluding content presented in a scrollable content unit, in accordance with an embodiment.

In the example of FIG. 5, the online system 140 presents a user with a content feed 500A including a plurality of content items 501A, 502A and a scrollable content unit 505A including an ordered set 510 of content items 515A-515D. When the content feed 500A is presented to the user, content item 515A, which has a first position in the ordered set 510, is presented in the display area of the scrollable content unit 505A. In alternative embodiments, content item 515A is presented by the display area of the scrollable content unit 505A when the user interacts with the content feed 500A (e.g., requests to view additional content in the content feed 500A). In the example of FIG. 5, the online system 140 does not receive a user interaction with the scrollable content unit 505A.

The online system 140 receives a request from the user to present additional content to the user and retrieves information stored by the online system 140 identifying the ordered set 510 of content items 515A-515D and interactions with content items 515A-515D in the ordered set 510 included in the scrollable content unit 505A. Based on the retrieved information, the online system 140 determines that the content item 515A of the ordered set 510 was previously presented to the user in the display area of the scrollable content unit 505A, while the remaining content items 515B-525D were not previously presented to the user. To improve the likelihood of the user interacting with content presented in an additional scrollable content unit, the online system 140 modifies 510 the ordered set of content items 515A-515D by excluding content item 515A, which was previously presented, from inclusion in an additional scrollable content unit.

Based on information associated with the user by the online system 140, the online system 140 generates an additional content feed 500B including a plurality of content items 501B, 502B and a refreshed scrollable content unit 505B including the modified ordered set 520 of content items 515B-525D that excludes content item 515A. The online system 140 communicates the additional content feed 500B to a client device 110 for presentation to the user, with the display area of the refreshed scrollable content unit 505B presenting content item 515B in its display area. If the user interacts with the scrollable content 505B unit to navigate through the modified ordered set 520 of content items 515B-515D via the display area of the scrollable content unit 505B, content items 515C, 515D are presented to the user via the display area of the refreshed scrollable content unit 505B.

Figure 6:
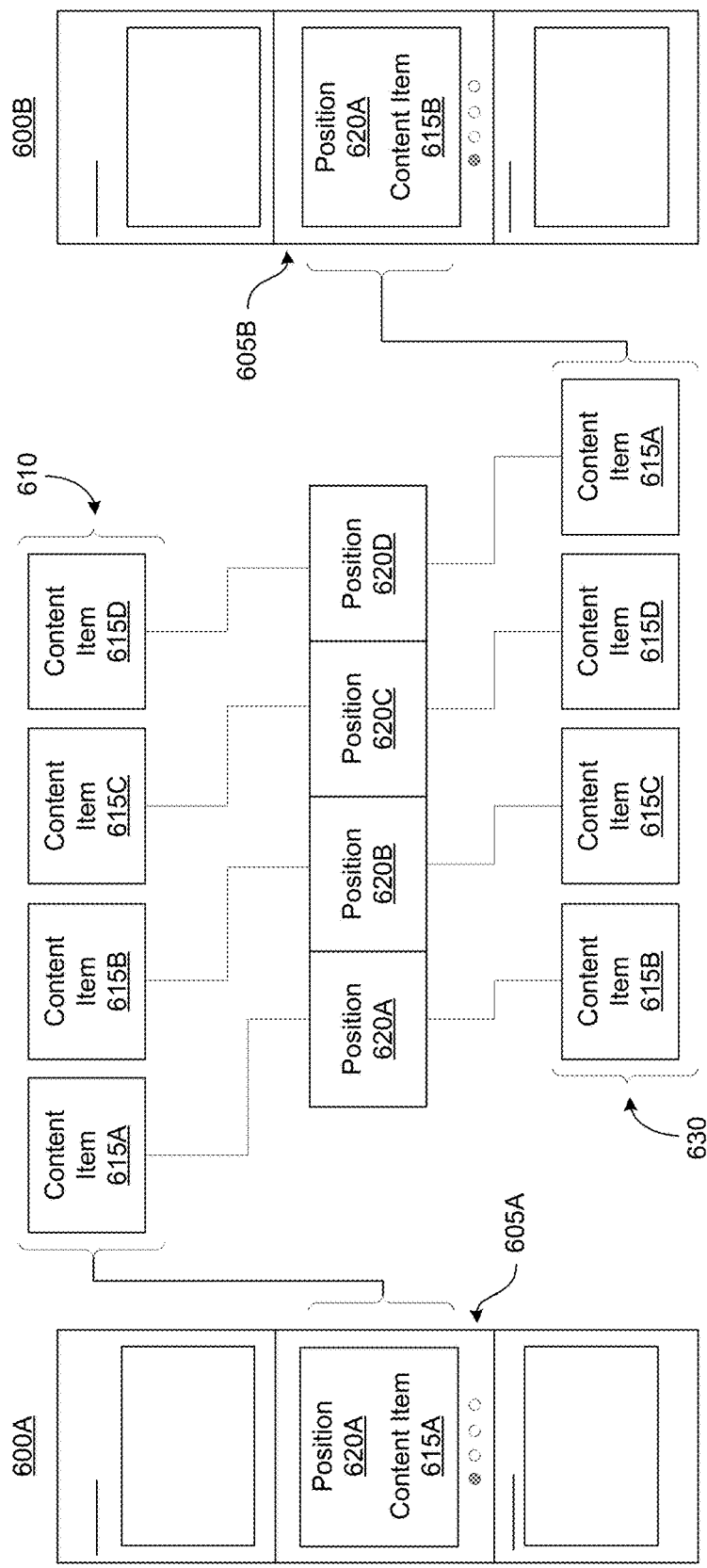
FIG. 6 is an example of presenting content to an online system user based on positions associated with content items presented in a scrollable content unit, in accordance with an embodiment.

FIG. 6 shows an example where the online system 140 presents a user with a content feed 600A including content items maintained by the online system 140 and a scrollable content unit 605A that includes four positions 620A-D for association with content items specifying an order in which content items are presented in in the display area of the scrollable content unit 605A as well as an ordered set 610 of content items 615A-615D. Each position 620A-D in the scrollable content unit 605A is associated with a content item 615A-D from the ordered set 610 of content items 615A-615D to identify an order in which the display area of the scrollable content unit 605A presents the content items 615A-615D from the ordered set 610. In the example of FIG. 6, the first position 620A in the scrollable content unit 605A is associated with content item 615A from the ordered set 610, the second position 620B in the scrollable content unit 605A is associated with content item 615B of the ordered set 610, the third position 620C in the scrollable content unit 605A is associated with content item 615C of the ordered set 610, and the fourth position 620D in the scrollable content unit 605A is associated with content item 615D of the ordered set 610.

When the online system 140 receives an interaction with the content feed 600A, content item 615A, which is associated with the first position 620A, is presented in the display area of the scrollable content unit 605A. Alternatively, content item 615A is presented in the display area of the scrollable content unit 605A when the content feed 600A is presented to the user. If the online system 140 receives a user interaction with the scrollable content unit 605A while content item 615A is presented, the online system 140 modifies the display area of the scrollable content unit 605A to present content item 615B, which is associated with the second position 620B in the scrollable content unit 605A. However, in the example of FIG. 6, the online system 140 does not receive a user interaction with the scrollable content unit 605A. Because a user interaction with the scrollable content unit 605A was not received in the example of FIG. 6, the online system 140 modifies the ordered set 610 of content items 615A-615D by associating content items 615B-615D, which were not presented in the display area of the scrollable content unit 605A, with earlier positions 620A-620C so a content item 615B-615D that was not previously presented to the user is in the position 620A of a refreshed scrollable content unit 605B that is initially presented in the display area of the refreshed scrollable content unit 605B. In some embodiments, content item 615A, which was previously presented to the user, is associated with a later position 620D of the refreshed scrollable content unit 605B. Alternatively, content item 615A, which was previously presented to the user, is not associated with a position 620 of the refreshed scrollable content unit 605B.

The online system 140 receives an additional request from the user for content and generates a content feed 600B including additional content items and a refreshed scrollable content unit 605B that includes a modified ordered set 630 of content items 615A-615B, where the content items 615A-615B are associated with different positions 620 of the refreshed scrollable content unit 605B. The online system 140 presents the content feed 600B to the user with content item 615B, which is associated with the first position 620A associated with the refreshed scrollable content unit 605B, in the display area of the refreshed scrollable content unit 605B. Hence, the refreshed scrollable content unit 605B initially presents the user with a content item 615B that was not previously presented to the user (or presents the user with the content item 615B that was not previously presented to the user when the user interacts with the content feed 600B). If the user interacts with the refreshed scrollable content unit 605B to view other content items from the modified ordered set 630, the online system 140 modifies the display area of the refreshed scrollable content unit 605B to present content item 615C, which is associated with a second position 620B of the refreshed scrollable content unit 605B; similarly, the online system 140 presents additional content items 615D, 615A associated with subsequent positions 620C, 620D of the refreshed scrollable content unit 605B if the user further interacts with the refreshed scrollable content unit 605B. In alternative embodiments, the refreshed scrollable content unit 605B initially presents a content item 615 associated with a position 620 of the refreshed scrollable content unit 605B other than the first position 620A when the refreshed scrollable content unit 605B is presented rather than modifying associations between content items 615 and positions 620 of the refreshed scrollable content unit 605B.

Figure 7:
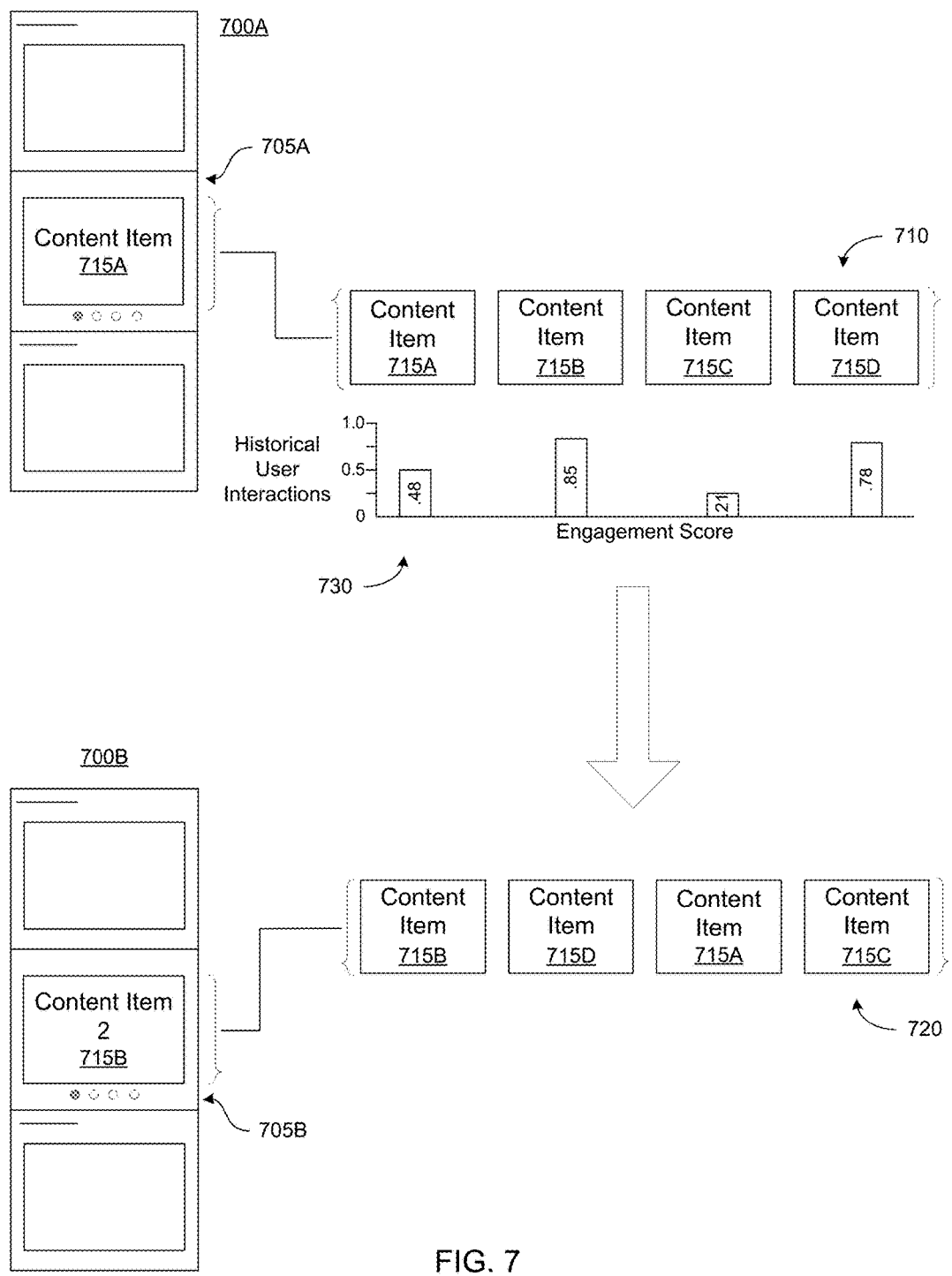
FIG. 7 is an example of presenting content to an online system user based on user interactions with content presented in a scrollable content unit, in accordance with an embodiment.

In some embodiments, the online system 140 orders content items in an ordered set of content items included in a scrollable content unit based on interactions of online system users with the content items (or with content associated with the content items). In the example of FIG. 7, the online system 140 orders content items 715A-D in an ordered set 710 of content items associated with a scrollable content unit 705A based on a measure of historical user engagement of online system users with the content items 715A-D. Content items 715A-715D associated with greater measures of historical user engagement are ordered earlier in the ordered set 710 than content items 715A-715D associated with lower measures of user engagement. In the example of FIG. 7, the online system 140 presents a user with a content feed 700A including a plurality of content items retrieved by the online system 140 for presentation to the user and the scrollable content unit 705A including the ordered set 710 of content items 715A-715D for presentation to the user in a display area of the scrollable content unit 705A.

When the scrollable content unit 705A is presented to the user, content item 715A, which has a first position in the order of the ordered set 710 is presented in the display area of the scrollable content unit 705A. If the user navigates away from the scrollable content unit 705A without interacting with the scrollable content unit 705A and the online system 140 subsequently receives a request from the user to present additional content to the user, the online system 140 determines that fewer than all of the content items 715A-715D in the ordered set 710 were presented to the user by the scrollable content unit 705A. Accordingly, the online system 140 modifies the ordered set 710 of content items 715A-715D based in part on the content item 715A previously presented by the scrollable content unit 705A and on current measures of engagement by online system users with various content items 715A-715D in the ordered set 710 (or with content associated with various content items 715A-715D). In some embodiments, the online system 140 computes an engagement score 730 for each content item 715A-D in the ordered set 710 based on historical numbers of interactions with each content item 715A-D by various users of the online system 140 (e.g., all users of the online system 140). Based on the engagement scores 730, the online system 140 modifies the order of the content items 715A-D in the ordered set 710.

User interactions with each content item 715A-715D may include an amount of time various users viewed or accessed each content item 715A-715D, as well as other types of interactions with the content items 715A-715D. Example interactions with a content item 715 include: expressing a preference for the content item 715, sharing the content item 715 with another user, and providing a comment associated with the content item 715. As further described above in conjunction with FIG. 3, an engagement score for a content item 715 may account for different positions in content feeds presented to various online system users that included the content item 715 by applying position discounts associated with different positions to interactions by various online system users with the content item 715. Additionally, different interactions with the content items 715A-715D may be differently weighted when determining the engagement scores, or interactions with different content items 715A-715D may be differently weighted when determining the engagement scores. For example, interactions with a content item 715A already presented in the display area of the scrollable content unit 705A may be weighted lower than interactions with content items 715B-715D that were not previously presented to the user.

In the example of FIG. 7, the online system 140 determines engagement scores for the content items 715A-715D based on the historical number of interactions per thousand impressions of each content item 715A-715D at the time the ordered set 710 is modified. For example, content item 715A has an engagement score of 0.48, content item 715B has an engagement score of 0.85 for content item, content item 715C has an engagement score of 0.21, and content item 715D has an engagement score of 0.78. Based on the engagement scores 730, the online system 140 generates a modified ordered set 720 of content items 715A-715D where content item 715B has a first position in an order of the modified ordered set 720, content item 715D) has a second position in the order of the modified ordered set 720, content item 715A has a third position in the order of the modified ordered set 720, and content item 715C has a fourth position in the order of the modified ordered set 720.

The online system 140 generates an updated content feed 700B including a plurality of content items and a refreshed scrollable content unit 705B including the modified ordered set 720 of content items 715A-715D. When the updated content feed 700B is presented to the user, content item 715B is initially presented to the user in the display area of the refreshed scrollable content unit 705B. If the user interacts with the refreshed scrollable content unit 705B, the online system 140 presents content items 715D, 715A, 715C in the display area of the refreshed scrollable content unit 705B based on their positions in the order of the modified ordered set 720. In some embodiments, the online system 140 updates the order of the content items 715A-715D in the modified ordered set 720 based on user interactions with content items 715A-715D while the refreshed scrollable content unit 705B is presented to the user, allowing the online system 140 to dynamically modify the order in which the refreshed scrollable content unit 705B presents content items 715A-715D.

Figure 8:
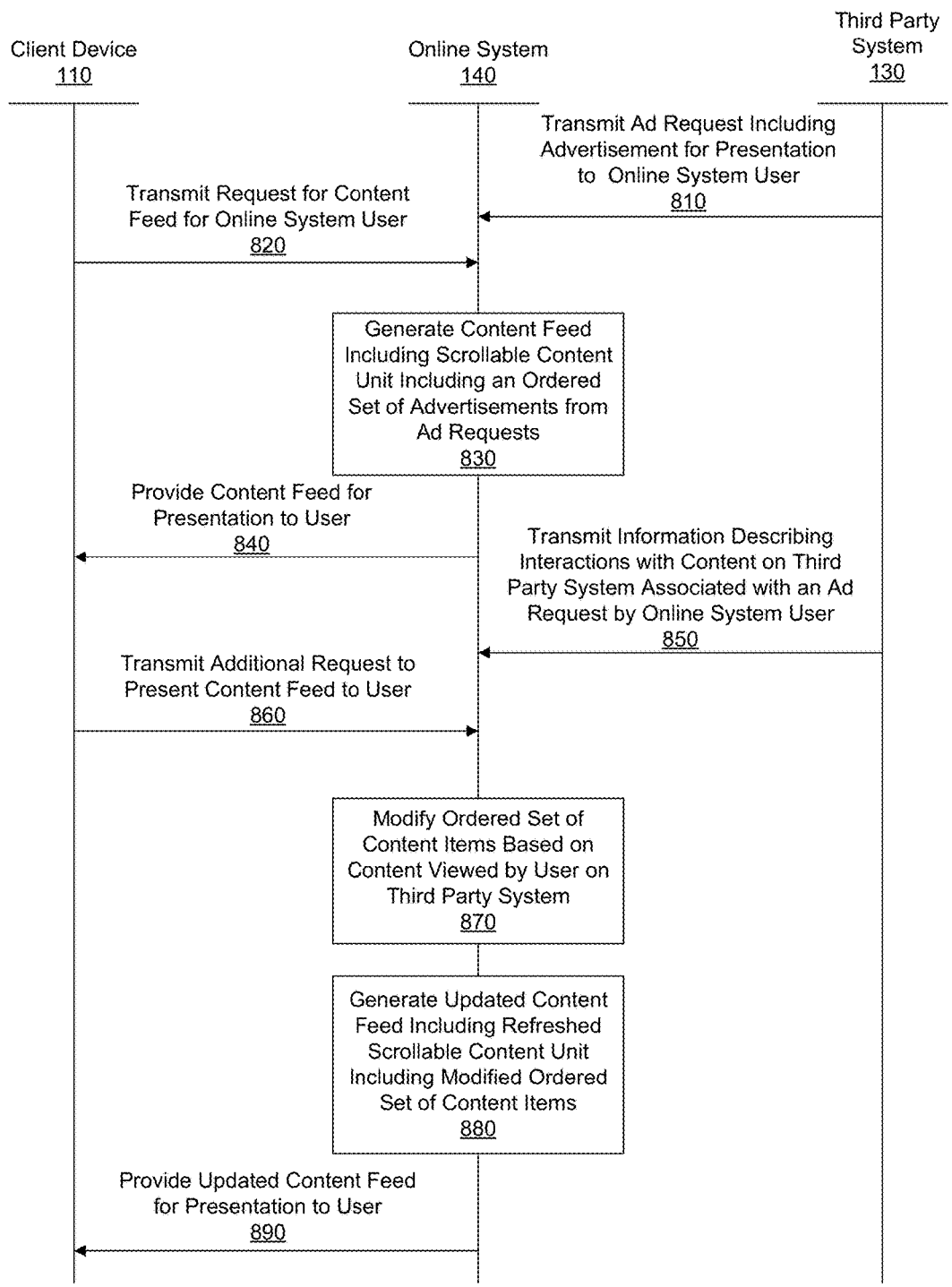
FIG. 8 is an interaction diagram of a method for presenting content to an online system user based on content presented in a scrollable content unit and content viewed by the user on a third party system, in accordance with an embodiment.

In some embodiments, the online system 140 orders content items in an ordered set included in a scrollable content unit based on a user's interactions with content associated with content items included in the ordered set. The content may be internal to or external to the online system 140. For example, if a user navigates away from the scrollable content unit before each content item in the ordered set has been presented in the display area of the scrollable content unit, the online system 140 prioritizes content items in the ordered set associated with high measures of relevance to the user for presentation in the display area when the scrollable content unit is again provided. FIG. 8 is an interaction diagram of a method for presenting content to an online system user based on content presented in a scrollable content unit and interactions with content on a third party system 130 by the user. In some embodiments, the method may include different and/or additional steps than those described in conjunction with FIG. 8. Additionally, in some embodiments, steps of the method may be performed in a different order than the order described in conjunction with FIG. 8.

A third party system 130 transmits 810 one or more ad requests including advertisements to the online system 140. Additionally, a client device 110 associated with a user transmits 820 a request for a content feed for a user of the online system 140. As described above in conjunction with FIG. 2, based on characteristics of the user, characteristics of content items maintained by the online system 140, and bid amounts associated with the advertisements in the ad requests received form the third party system 130, the online system 140 generates 830 a content feed including a plurality of content items and a scrollable content unit including an ordered set of content items that includes one or more of the advertisements in the ad requests received from the third party system 130.

The online system 140 provides 840 the content feed to the client device 110 for presentation to the user. Additionally, the third party system 130 transmits 850 information from the third party system 130 describing interactions by the user with content (e.g., a product information page) provided by the third party system 130 and associated with one or more of the ad requests in the ordered set of content items. The online system 140 receives an additional request to present a content feed for display to the user transmitted 860 from the client device 110. Based on content items presented to the user via the scrollable content unit provided 840 to the client device 110 and based on the information received 850 from the third party system 130 describing the user's interactions with content provided by the third party system 130 and associated with one or more ad requests in the ordered set, the online system 140 modifies 870 the order of the ad requests in the ordered set. For example, the online system 140 modifies 870 the ordered set of ad requests to prioritize presentation of an advertisement from an ad request associated with content with which the user performed at least a threshold amount of interaction. The online system 140 generates 880 an updated content feed including a plurality of content items selected for display to the user and a refreshed scrollable content unit including the modified ordered set of content items and provides 890 the updated content feed to the client device 110 for presentation to the user, with the refreshed scrollable content unit presenting advertisements from ad requests in its display area based on the modified order.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, a request to present a content feed to a user of the online system, wherein the content feed is scrollable vertically;
   generating the content feed, the content feed including a plurality of content items that comprises a user generated content item and a scrollable content unit that comprises:
      an ordered set of the plurality of content items; and
      a display area that displays a first subset of the ordered set of content items;
      wherein the scrollable content unit is independently and horizontally scrollable within the content feed at the display area such that the display area displays a different subset of the ordered set of content items;
   presenting the generated content feed to the user, wherein the generated content feed comprises a single column including at least one of the plurality of content items and the scrollable content unit vertically arranged within the single column;
   receiving one or more user interactions of the user with the content feed to independently scroll the scrollable content unit horizontally;
   responsive to receiving the one or more user interactions, updating the displayed subset of the ordered set of content items from the first subset of the ordered set of content items to a second subset of the ordered set of content items that includes at least one different content item than the first subset of the ordered set of content items;
   receiving an additional request to present an updated content feed to the user of the online system;
   responsive to receiving the additional request to present the updated content feed to the user of the online system, modifying the ordered set of content items of the scrollable content unit based at least in part on the first and second subsets of the ordered set of content items having been presented to the user, the modifying resulting in display of a third subset of the ordered set of content items in the display area that includes at least one content item not included in the first subset of the ordered set of content items, nor in the second subset of the ordered set of content items;
   generating the updated content feed including the scrollable content unit comprising the third subset of the ordered set of content items displayed in the display area; and
   presenting the updated content feed including the scrollable content unit displaying the third subset of the ordered set of content items to the user.

2. The method of claim 1, wherein the one or more user interactions comprise one or more requests to display one or more of the plurality of content items included in the scrollable content unit.

3. The method of claim 1, wherein displaying the first subset of the ordered set of content items in the display area of the scrollable content unit comprises:
 presenting a content item from the first subset of the ordered set of content items in the display area of the scrollable content unit; and
 presenting an additional content item from the first subset of the ordered set of content items based at least in part on a position of the additional content item in the ordered set in response to a user interaction with the scrollable content unit.

4. The method of claim 1, wherein modifying the ordered set of content items comprises:
 removing at least one of the content items of the first subset of the ordered set of content items displayed in the display area of the scrollable content unit from the ordered set.

5. The method of claim 1, wherein modifying the ordered set of content items comprises:
 reordering the ordered set of content items so a content item that was not in the first subset of the ordered set of content items has a position in the ordered set ahead of the at least one content item that was in the first subset of the ordered set of content items.

6. The method of claim 1, wherein modifying the ordered set of content items comprises:
 associating a content item from the ordered set of content items that was not in the first subset of the ordered set of content items with an initial position in the ordered set to be initially presented in the second subset of the ordered set of content items in in the display area of the scrollable content unit.

7. The method of claim 6, wherein modifying the ordered set of content items further comprises:
 associating one or more positions in the ordered set subsequent to the initial position with one or more additional content items not previously in the first subset of the ordered set of content items.

8. The method of claim 1, wherein modifying the ordered set of content items comprises:
 retrieving information stored by the online system describing one or more user interactions by users of the online system with each content item in the ordered set;
 computing a score for each content item in the ordered set based at least in part on the retrieved information; and
 ordering the content items in the ordered set based at least in part on the computed scores.

9. The method of claim 8, wherein the one or more user interactions by the users of the online system are selected from a group consisting of: selecting a content item, expressing a preference for the content item, sharing the content item with an additional user of the online system, requesting additional content associated with the content item, providing a comment associated with the content item, and any combination thereof.

10. The method of claim 1, wherein modifying the ordered set of content items comprises:
 receiving information describing one or more user interactions of the user with content external to the online system and associated with one or more content items in the ordered set of content items; and
 ordering the content items in the ordered set based at least in part on the received information.

11. A computer program product comprising a computer readable storage medium having instructions encoded thereon that, when executed by a processor, cause the processor to:
 receive, at an online system, a request to present a content feed to a user of the online system, wherein the content feed is scrollable vertically;
 generate the content feed, the content feed including a plurality of content items that comprises a user generated content item and a scrollable content unit that comprises:
  an ordered set of the plurality of content items; and
  a display area that displays a first subset of the ordered set of content items;
  wherein the scrollable content unit is independently and horizontally scrollable within the content feed at the display area such that the display area displays a different subset of the ordered set of content items;
 present the generated content feed to the user, wherein the generated content feed comprises a single column including at least one of the plurality of content items and the scrollable content unit vertically arranged within the single column;
 receive one or more user interactions of the user with the content feed to independently scroll the scrollable content unit horizontally;
 responsive to receiving the one or more user interactions, update the displayed subset of the ordered set of content items from the first subset of the ordered set of content items to a second subset of the ordered set of content items that includes at least one different content item than the first subset of the ordered set of content items;
 receive an additional request to present an updated content feed to the user of the online system;
 responsive to receiving the additional request to present the updated content feed to the user of the online system, modify the ordered set of content items of the scrollable content unit based at least in part on the first and second subsets of the ordered set of content items having been presented to the user, the modifying resulting in display of a third subset of the ordered set of content items in the display area that includes at least one content item not included in the first subset of the ordered set of content items, nor in the second subset of the ordered set of content items;
 generate the updated content feed including the scrollable content unit comprising the third subset of the ordered set of content items displayed in the display area; and
 present the updated content feed including the scrollable content unit displaying the third subset of the ordered set of content items to the user.

12. The computer program product of claim 11, wherein update the displayed subset of the ordered set of content items in the display area of the scrollable content unit comprises:
 present a content item from the first subset of the ordered set of content items in the display area of the scrollable content unit; and
 present a content item from the second subset of the ordered set of content items in response to a user interaction with the scrollable content unit.

13. The computer program product of claim 11, wherein modify the ordered set of content items comprises:
 remove at least one of the content items of the first subset of the ordered set of content items displayed in the display area of the scrollable content unit from the ordered set.

14. The computer program product of claim 11, wherein modify the ordered set of content items comprises:

reorder the ordered set of content items so a content item not in the first subset of the ordered set of content items has a position in the ordered set ahead of at least one content item in the first subset.

15. The computer program product of claim 11, wherein modify the ordered set of content items comprises:
associate a content item from the ordered set of content items that was not in the first subset of the ordered set of content items with an initial position in the ordered set to be initially presented in the second subset of the ordered set of content items in in the display area of the scrollable content unit.

16. The computer program product of claim 15, wherein modify the ordered set of content items further comprises:
associate one or more positions in the ordered set subsequent to the initial position with one or more additional content items not previously in the first subset of the ordered set of content items.

17. The computer program product of claim 11, wherein modify the ordered set of content items comprises:
retrieve information stored by the online system describing one or more user interactions by users of the online system with each content item in the ordered set;
compute a score for each content item in the ordered set based at least in part on the retrieved information; and
order the content items in the ordered set based at least in part on the computed scores.

18. The computer program product of claim 17, wherein the one or more user interactions by the users of the online system are selected from a group consisting of: selecting a content item, expressing a preference for the content item, sharing the content item with an additional user of the online system, requesting additional content associated with the content item, providing a comment associated with the content item, and any combination thereof.

19. The computer program product of claim 11, wherein modify the ordered set of content items comprises:
receive information describing one or more user interactions of the user with content external to the online system and associated with one or more content items in the ordered set of content items; and
order the content items in the ordered set based at least in part on the received information.

20. A system, comprising:
a processor for executing computer program instructions; and
a non-transitory computer-readable storage medium storing computer program instructions executable by the processor to perform operations comprising:
receiving, at an online system, a request to present a content feed to a user of the online system, wherein the content feed is scrollable vertically;
generating the content feed, the content feed including a plurality of content items that comprises a user generated content item and a scrollable content unit that comprises:
an ordered set of the plurality of content items; and
a display area that displays a first subset of the ordered set of content items;
wherein the scrollable content unit is independently and horizontally scrollable within the content feed at the display area such that the display area displays a different subset of the ordered set of content items;
presenting the generated content feed to the user, wherein the generated content feed comprises a single column including at least one of the plurality of content items and the scrollable content unit vertically arranged within the single column;
receiving one or more user interactions of the user with the content feed to independently scroll the scrollable content unit horizontally;
responsive to receiving the one or more user interactions, updating the displayed subset of the ordered set of content items from the first subset of the ordered set of content items to a second subset of the ordered set of content items that includes at least one different content item than the first subset of the ordered set of content items;
receiving an additional request to present an updated content feed to the user of the online system;
responsive to receiving the additional request to present the updated content feed to the user of the online system, modifying the ordered set of content items of the scrollable content unit based at least in part on the first and second subsets of the ordered set of content items having been presented to the user, the modifying resulting in display of a third subset of the ordered set of content items in the display area that includes at least one content item not included in the first subset of the ordered set of content items, nor in the second subset of the ordered set of content items;
generating the updated content feed including the scrollable content unit comprising the third subset of the ordered set of content items displayed in the display area; and
presenting the updated content feed including the scrollable content unit displaying the third subset of the ordered set of content items to the user.

* * * * *